United States Patent [19]

Matsunaga

[11] Patent Number: 4,648,856

[45] Date of Patent: Mar. 10, 1987

[54] ENDLESS BELT WITH TENSION CORDS AND METHOD OF MAKING SUCH A BELT

[75] Inventor: Yasuyuki Matsunaga, Kakogawa, Japan

[73] Assignee: Bando Kagaku Kabushiki Kaisha, Kobe, Japan

[21] Appl. No.: 798,625

[22] Filed: Nov. 15, 1985

[30] Foreign Application Priority Data

Nov. 21, 1984 [JP] Japan .................. 59-247394
Feb. 27, 1985 [JP] Japan .................. 60-039523
Feb. 28, 1985 [JP] Japan .................. 60-040881
Sep. 19, 1985 [JP] Japan ............. 60-143965[U]

[51] Int. Cl.⁴ .............................................. F16G 1/00
[52] U.S. Cl. .................... 474/237; 474/260; 156/138
[58] Field of Search ............... 474/204, 205, 237, 260, 474/261, 265, 263; 156/138, 159; 198/193

[56] References Cited

U.S. PATENT DOCUMENTS 1,735,686 11/1929 Kimmich ........................ 156/159
3,101,290 8/1963 Paul ................................ 156/137
3,234,611 2/1966 Paasche ............................. 24/38
3,481,807 12/1969 Kanamori ...................... 156/159
3,724,645 4/1973 Spaar ............................. 198/193
3,919,025 11/1975 Ray ........................... 474/260 X

FOREIGN PATENT DOCUMENTS 55-20901 6/1980 Japan .
55-20902 6/1980 Japan .
58-216804 12/1983 Japan .

Primary Examiner—James A. Leppink
Assistant Examiner—Frank H. McKenzie, Jr.
Attorney, Agent, or Firm—Marshall, O'Toole, Gerstein, Murray & Bicknell

[57] ABSTRACT

This disclosure relates to an endless belt comprising a bed of elastic material and a plurality of longitudinally extending tension cords embedded therein. Each of the cords has its ends interconnected to form a junction, and the junctions of the cords are distributed over the length of said belt so that the junctions are longitudinally offset.

The disclosure further relates to a process of producing such an endless belt.

12 Claims, 33 Drawing Figures

ENDLESS BELT WITH TENSION CORDS AND METHOD OF MAKING SUCH A BELT

FIELD AND BACKGROUND OF THE INVENTION

The present invention relates to a flexible endless belt made of elastic material containing tension cords which extend longitudinally of the belt.

One conventional method of producing an endless belt of this type comprises the steps of preparing a long belt with tension cords, cutting the long belt into required lengths, paring the ends of a cut length to bare both end portions of the cords, forming the cut length into a loop and overlapping the end portions of the cords in side-by-side relation, placing unvulcanized rubber layers over the end portions, placing cover rubber layers over the unvulcanized layers, and vulcanizing the rubber layers.

In the product according to the foregoing conventional method, the junction of the ends of the cords are at the same longitudinal location, and this location tends to be lower in bending strength than the remainder of the belt.

Another conventional method comprises the steps of coiling one or more tension cords around and between a pair of spaced supporting rolls to form a spiral cord, and covering both the outer and inner sides of the cord with cover rubber layers.

In the product according to the above second conventional method, if it is required to bolt a number of laterally extending cross stops on the outer side of the belt or to form holes in the belt surface, it would be difficult to longitudinally align the stops or the holes in rows because they would interfere with the slanting turns of the spiral cord.

It is a general object of the invention to provide an endless belt containing tension cords, which is uniform in bending and other strengths along the entire belt length, and which allows stops or other additional members to be easily fixed to the belt in longitudinal rows.

SUMMARY OF THE INVENTION

An endless belt according to the invention comprises a plurality of tension cords, each of the cords having two ends which are connected together to form a junction, the cords being embedded in an elastic material and each cord extending longitudinally of the belt, and the junction of each cord being longitudinally spaced or offset from the junctions of any other cords so that the junctions are distributed over the entire length of the belt.

A method of producing such an endless belt according to the invention comprises the steps of providing a pair of spaced rolls having parallel axes, winding a plurality of tension cords around the rolls, interconnecting both ends of each of the cords to form a junction, longitudinally shifting a number of the cords so that each of the junctions are longitudinally spaced from the other junctions, and covering both outer and inner sides of the cords with rubber layers.

BRIEF DESCRIPTION OF THE DRAWINGS

Preferred embodiments of the invention will be described below with reference to the accompanying drawings, wherein.

DETAILED DESCRIPTION OF THE DRAWINGS

Figure 1:
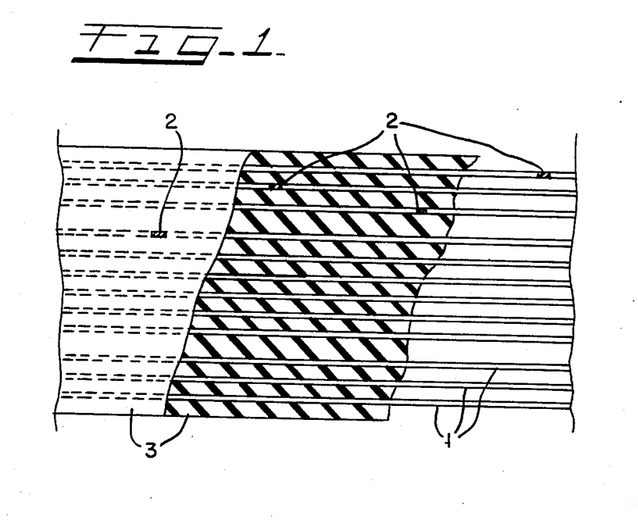
FIG. 1 is a fragmentary top plan view partially cut away showing a belt produced according to the invention.

With reference to FIG. 1, an endless belt according to the invention comprises top and bottom layers 3 of an elastic material such as natural or synthetic rubber, the layers being formed in an endless loop. A plurality of laterally spaced cords 1 are embedded in the layers 3. Each cord is also shaped in a loop and its ends are connected together at a junction 2. The construction will be better understood from the following description of the method for making the belt.

Figure 2:
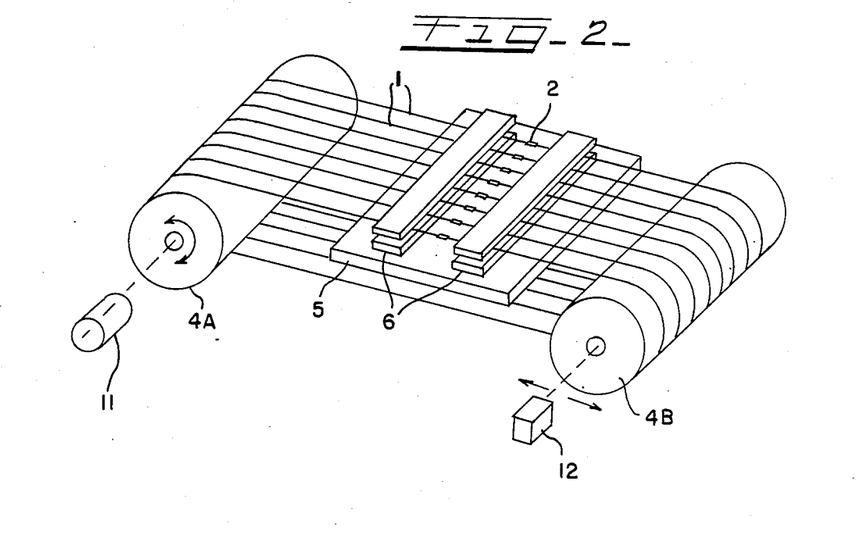
FIGS. 2 and 3 are perspective views showing steps of a process of producing a belt according to the invention.
Figures 3, 4A, 4B, 4C, 4D:
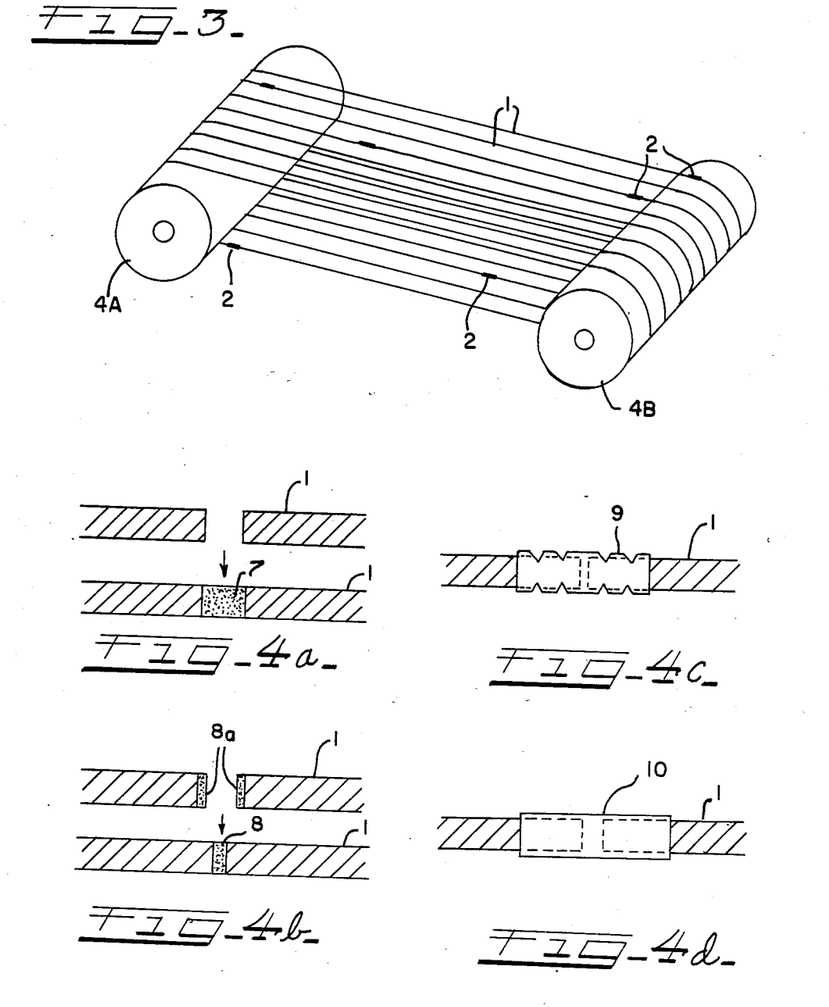
FIGS. 4a–4d are sectional views showing various methods of joining both ends of tension cords for a belt according to the invention.

In FIGS. 2 and 3, an apparatus for producing such a belt is shown, which includes a pair of spaced parallel support rolls 4A and 4B, the roll 4A being a drive roll and the roll 4B being a follower roll. The rolls 4A and 4B are supported by a frame (not shown) in a conventional manner. Also mounted on the frame is a rotary drive 11 coupled to the roll 4A for turning the roll 4A, and a mechanism 12 coupled to one of the rolls, such as the roll 4B, for moving the rolls toward or away from each other. A table 5 is supported by the frame between the rolls 4, and a pair of spaced parallel clamps 6 are mounted on the table.

A number of tension cords 1 are wound around and between the rolls and extend in parallel with each other butare spaced from each other. The cords 1 should have a high tensile strength, and may be made of (stainless) steel, carbonfiber, (aromatic) polyamide, or glass fiber, for example.

Each cord 1 preferably is formed by a plurality of twisted strands, and the cords 1 should be alternately of S and Z twists, in order to counteract the repulsion of such twists. This will eliminate distortion of the belt when vulcanized, and improve the travelling of the belt when in use.

Both end portions of each cord 1 are grasped by the clamps 6, with the length of the cords adjusted so that the end portions are adjacent each other. The ends of each cord 1 are interconnected to form a junction 2 by a method such as those shown in FIGS. 4a to 4b. FIG. 4a shows a brazed junction 7; FIG. 4b shows fusion welding or metallurgical connection 8 of fused ends 8a of a cord; FIG. 4c shows a mechanical connection by a sleeve 9; and FIG. 4d shows chemical adhesion by rubber or synthetic resin 10.

As shown in FIG. 3, after the junctions 2 are formed the table 5 with the clamps 6 is then removed. All cords 1 but one are then manually, longitudinally moved successively by various distances, in order to shift the junctions 2 so that each junction 2 will be longitudinally offset from the others.

The roll 4B is then shifted to apply a suitable tension to the cords 1. Both outer and inner sides of the cords 1 are then covered by rubber layers 3 (FIG. 1), with an unvulcanized rubber layer for adhesion interposed between the cords 1 and the cover layers 3, in the conventional manner, by rotating the drive roll 4A. Finally, the entire belt is vulcanized in the conventional manner to completely adhere the cover layers 3 and the cords 1 together.

Test of Bending Fatigue

An endless belt was produced according to the previously described method of the present invention, according to the following specification:

Belt Width: 150 mm (millimeters)
Belt Length: 9,000 mm
Number of Embedded Steel Cords: 15
Pitch of Embedded Cords: 9.0 mm
Cord Diameter: 3.5 mm
Cord Construction: 7×7×0.37 mm.

Another endless belt was produced according to the first described conventional method wherein the junctions are at the same longitudinal locations, this belt having the same specifications described above in other respects.

Figure 5:
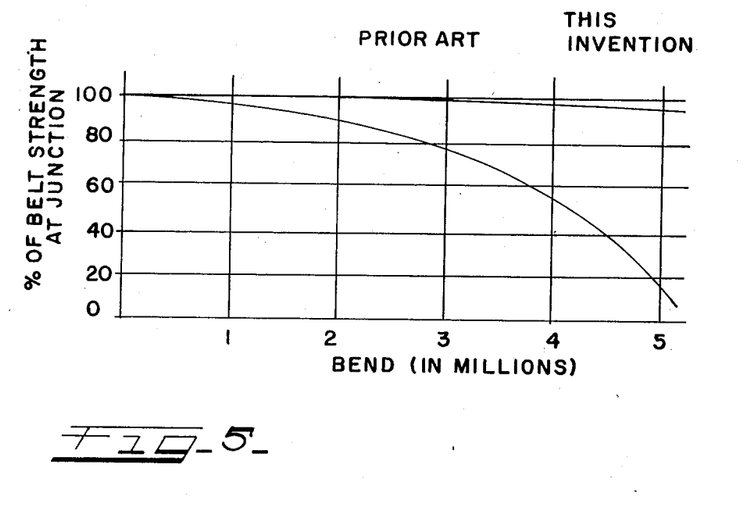
FIG. 5 is a graph showing a comparison of the bending fatigue of belts according to the invention and the prior art.

Tests were made of the bending fatigue of both belts under the same conditions and in the usual manner, with the results as shown in FIG. 5, which shows that the belt according to this invention substantially maintained a high strength even after 5 million bending cycles, whereas the strength of the prior art belt decreased substantially, particularly after 3 million cycles. This is true because, in the belt of the invention, the relatively weak spots at the junctions 2 of the cords 1 are distributed longitudinally of the belt, so that there is not a single particularly weak spot.

The distance between the rolls 4A and 4B should, of course, be adjusted to obtain a desired length of the endless belt.

The endless belt shown in FIGS. 6–11b can be used with a vehicle having an electromagnet drive in a "Continuous Transit System by Magnet". The belt includes a belt body 21 which is substantially the same as the belt shown in FIG. 1. The body 21 includes a number of longitudinal tension cords 24 and rubber layers 25. The cords 24 are arranged in groups which form two spaces 23 between them.

Figure 6:
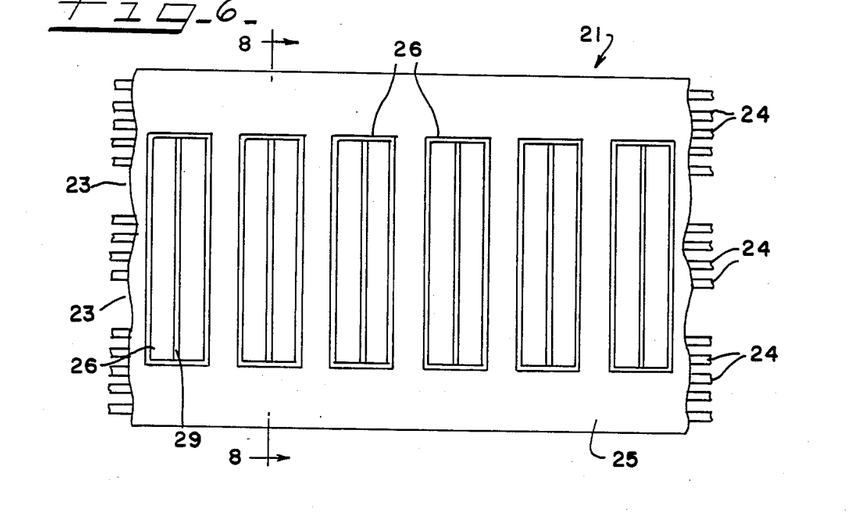
FIG. 6 is a fragmentary top plan view of a magnetic belt according to the invention.
Figure 7:
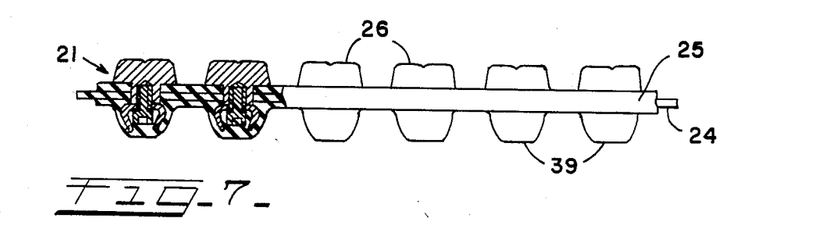
FIG. 7 is a side view partially in section of the belt shown in FIG. 6.

A number of magnetic metal blocks 26 are secured to the outer surface of the belt and are spaced from each other longitudinally of the belt. Each block 26 extends laterally of the belt in parallel with the other blocks, and is spaced from both edges of the belt. The end portions of the blocks extend over the spaces 23.

Figure 10A:
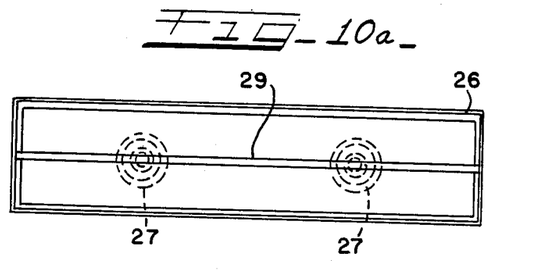
FIGS. 10a to 10c are respectively top plan, side and end views of a metal block of the belt shown in FIGS. 6–9.
Figure 10B:
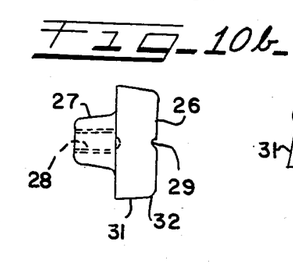
Figure 10C:
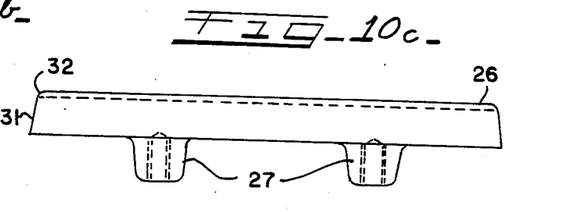

As best shown in FIGS. 10a to 10c, each metal block 26 has a pair of legs 27, which may be forged integrally on the bottom of the block. Further, each leg 27 has a female threaded hole 28. The block 26 has a top side with a central groove 29 extending laterally of the belt, tapered side and end walls 31 (FIGS. 10b–c) and round corners 32 around the top side and between the side and end walls. Each female thread 28 of the block 26 is engageable by a bolt 33, which has a hexagonal hole 34 formed in its head.

The groove 29 divides the upper surface of the metal block 26. This can improve the distribution of the flux density of the magnetic block 26 so as to improve the efficiency of attraction to the electromagnets. The groove 29 also facilitates the removal of the block 26 from the electromagnets adjacent the pulleys supporting the belt. Further, the groove 29 allows one to visually observe the amount of the wear of the block 26.

The block 26 should be chamfered or rounded to facilitate its removal from the electromagnets.

Figure 11A:
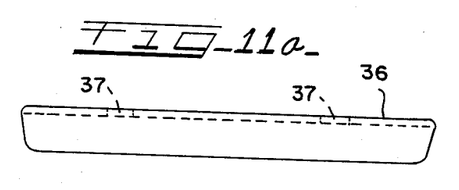
FIGS. 11a to 11b are respectively side and end views of a washer of the belt shown in FIGS. 7–9.
Figure 11B:
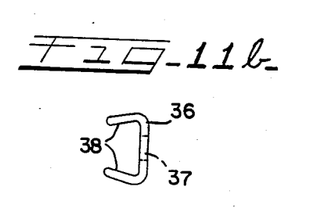

As best shown in FIGS. 11a and 11b, an elongated U-shaped washer 36 is provided below each block 26. Each washer has a top wall formed with a pair of holes 37 therethrough, and a pair of side walls 38 extending along the top wall. The bolts 33 extend through the holes 37 and the top wall engages the bottoms of the legs 27.

Figure 8:
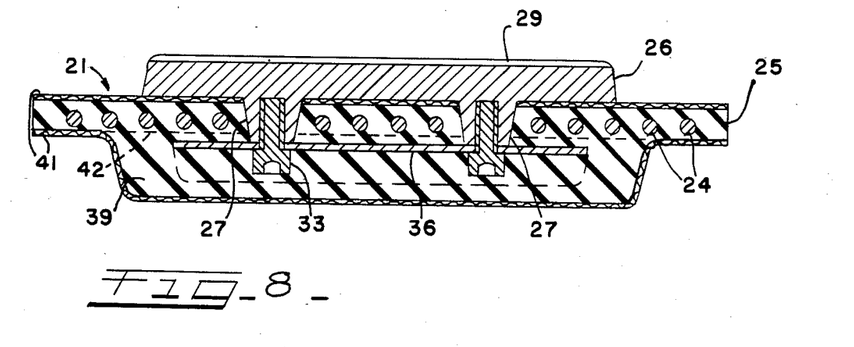
FIG. 8 is an enlarged sectional view along the line 8—8 in FIG. 6.
Figure 9:
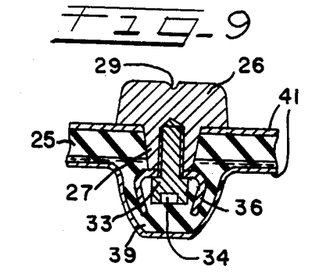
FIG. 9 is an enlarged view of part of the belt shown in FIG. 7.

This magnetic belt shown in FIGS. 6–11b is assembled by forming holes through the rubber layers 25 at predetermined intervals along the length of the belt; inserting the legs 27 of the metal blocks 26 into the holes and placing the washers 36 on the other side of the belt; engaging the bolts 33 through the holes 37 of the washers 36 and into the threads 28 of the legs 27, so that the bolt heads are located within the washers; and adhering a rubber tooth layer 39 (FIG. 8) to the inner side of the belt, so that the bolt heads and the washers are completely embedded in the belt body and adhered to the rubber. The belt also preferably has fabric covers 41 and reinforcing cloth 42 (FIG. 8).

The metal blocks 26 are thereby secured tightly to the belt body with the laterally extending washers 36 bolted to the legs 27 of the blocks, which legs extend through the belt body. Each washer 36 facilitates parallel positioning of the bolts 33 relative to the associated block 26. Also, the long washer 36 makes it possible to laterally evenly tighten the blocks to the belt body.

The blocks 26 engage the bolts 33 through their legs 27 at a position which is relatively displaced from the outer side of the belt and the legs 27 are adhered to the interior rubber material of the teeth 39, so that the bolts 33 may not easily be broken or loosened when there is an impact load or a stress concentration on an interface between the blocks and the belt body.

Figure 12:
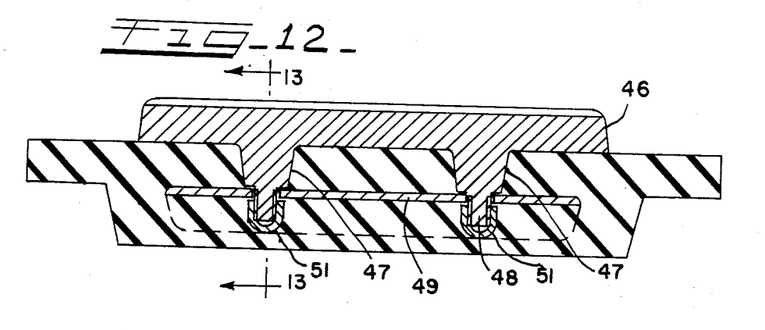
FIG. 12 is a sectional view of another form of magnetic belt according to the invention.
Figure 13:
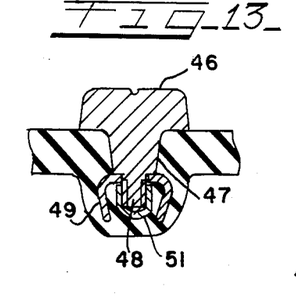
FIG. 13 is an enlarged fragmentary section along the line 13—13 of FIG. 12.
Figures 14, 15:
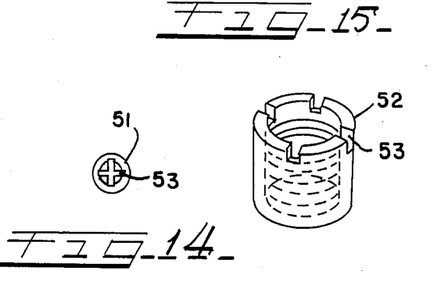
FIG. 14 is a plan view of a nut of the belt shown in FIG. 12.
FIG. 15 is an enlarged perspective view of an alternative nut which may be used in place of the nut shown in FIG. 14.

The belt shown in FIGS. 12-13 is generally similar to that of FIGS. 6-15b. Each metal block 46 has a pair of legs 47, each of which has a downward extension 48 formed with an outer thread. The extension 48 extends through an opening in a washer 49, and is secured thereto by a cap nut 51 as shown in FIGS. 12-14, or a circular nut 52 as shown in FIG. 15. The nut 51 or 52 has end grooves 53 for engagement with a screwdriver.

Figure 16A:
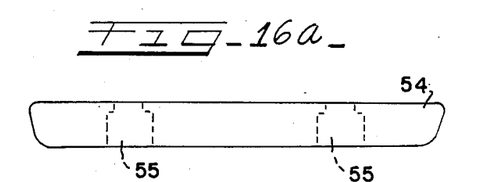
FIGS. 16a to 16c are respectively side, plan and end views of a washer for use in place of the washer shown in FIGS. 12 and 13.
Figure 16B:
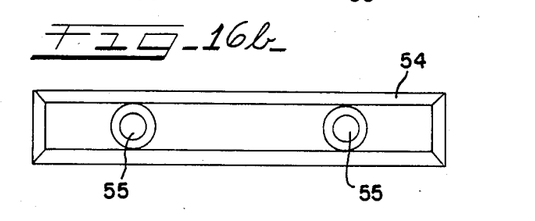
Figure 16C:
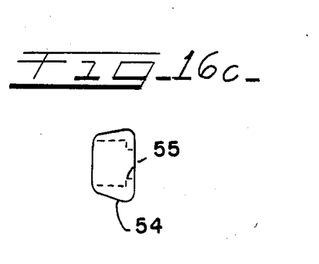

In FIGS. 12 to 13, the metal washer is U-shaped as previously described, but a solid metal washer 54 (FIGS. 16a-16c) may be formed with a pair of countersunk holes 55 therethrough for receiving bolts, which have hexagonal drive holes, or nuts.

Figure 17:
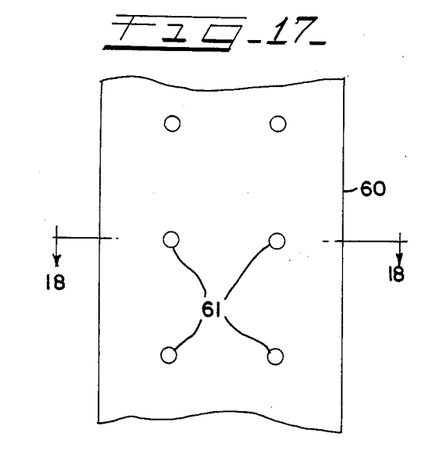
FIG. 17 is a top plan view of another form of belt according to the invention.
Figure 18:
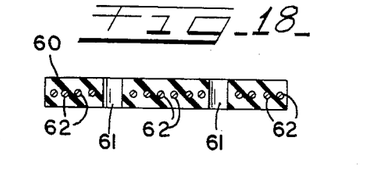
FIG. 18 is a sectional view along the line 18—18 of FIG. 17.
Figure 19:
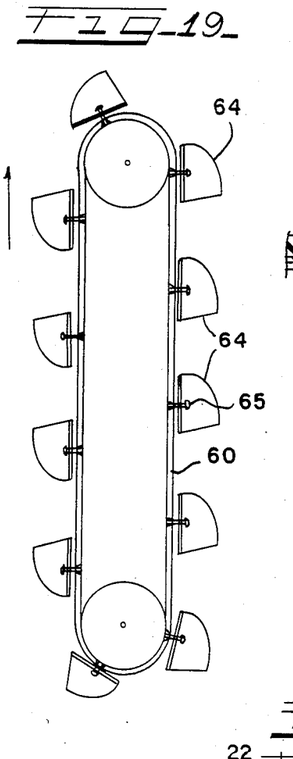
FIG. 19 is a side view of the belt shown in FIGS. 17 and 18, as used with buckets attached thereto.

In FIGS. 17 and 18, a belt 60, produced according to the method of FIGS. 1-4, is formed with two rows of holes 61 therethrough, each row being between groups of steel cords 62. Since the cords 62 are parallel with each other, the holes 61 can be longitudinally aligned without interfering with the cords 62. With reference to FIG. 19, this arrangement of the holes enables buckets 64 or the like to be mounted in a line on the belt 60 with pins 65 engaging the holes 61.

Figure 20:
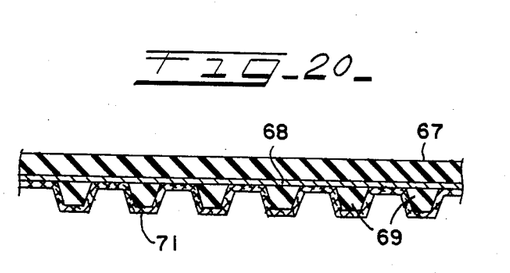
FIG. 20 is a sectional view of still another form of belt according to the invention.

In FIG. 20, a belt body 67 is produced according to the embodiment shown in FIGS. 1-4, and it has longitudinal steel cords 68. The body 67 is then provided with a number of laterally extending and longitudinally spaced rubber teeth 69 on its inner surface as described above. The teeth 69 and the inner belt surface are preferably covered with reinforcing cloth 71.

Figure 21:
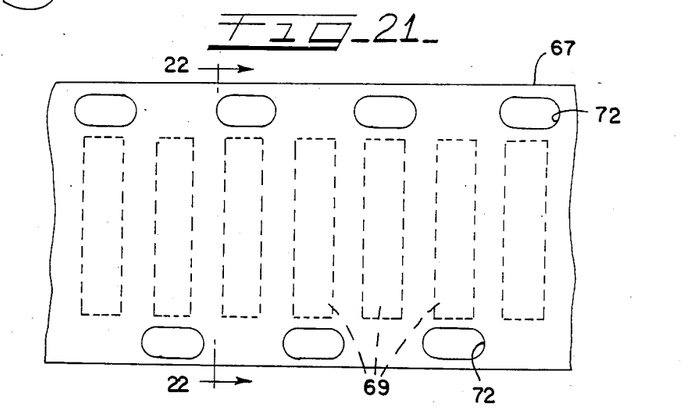
FIG. 21 is a top plan view of a modified form of the belt shown in FIG. 20.
Figure 22:
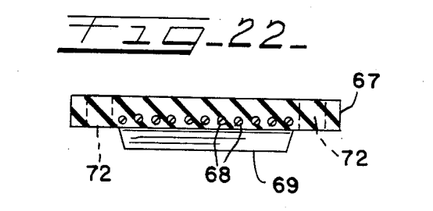
FIG. 22 is a sectional view along the line 22—22 in FIG. 21.

In FIGS. 21 and 22, a belt body 67 is provided that is similar to that in FIG. 20, but the teeth 69 are spaced from both side edges of the belt, and the steel cords 68 extend above the teeth 69. The body 67 is formed with two rows of holes 72 through its side margins outside the cords 68 and the teeth 69. The holes 72 are used as an air passage of a vacuum in order to suck corrugated boards, plates, etc. and carry them with the belt.

Figure 23:
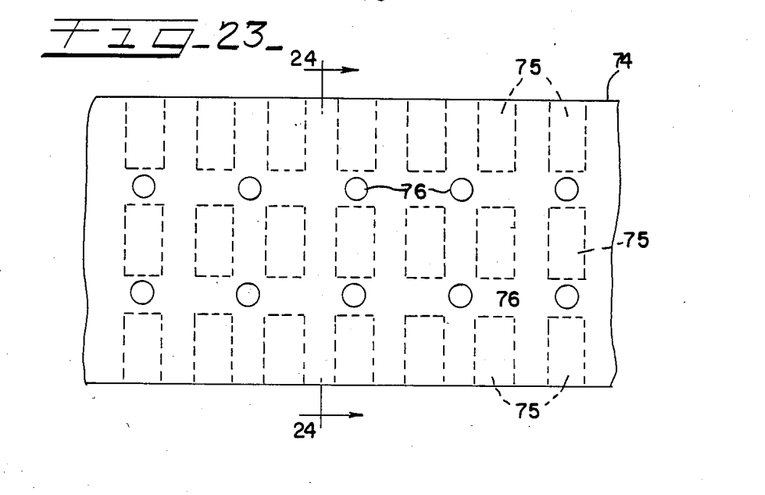
FIG. 23 is a top plan view of still another form of belt according to the invention.
Figure 24:
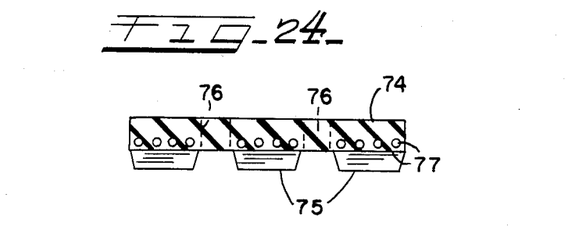
FIG. 24 is a sectional view along the line 24—24 in FIG. 23.

In FIGS. 23 and 24, the belt body 74 has laterally extending rows of rubber teeth 75, each row including three laterally spaced teeth, thereby forming three longitudinal lines of teeth. The body 74 is formed with a number of holes 76 therethrough in the spaces between the adjacent lines of teeth 75. As shown in FIG. 24, no steel cords 77 extend across the holes 76. The holes 76 are used as air passages to blow and dry wet materials being conveyed on the belt.

Figure 25:
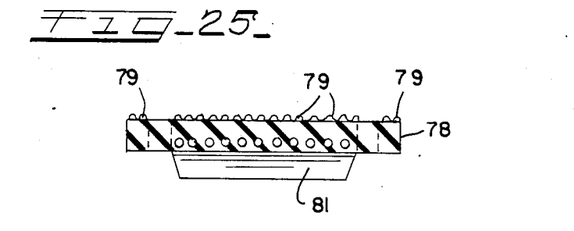
FIG. 25 is a sectional view of still another form of belt according to the invention.

In FIG. 25, a belt body 78 is similar to that in FIG. 22, but has a number of longitudinally extending fine ridges or corrugations 79 formed on its outer surface opposite the teeth 81.

What is claimed is:

1. An endless belt comprising a bed of elastic material, a plurality of longitudinally extending, laterally spaced tension cords embedded in said bed, each of said cords having two ends and said ends being interconnected to form a junction, the junctions of said cords being distributed over the longitudinal length of said belt and said junctions being longitudinally offset one from the others.

2. A belt as in claim 1, wherein said bed has outer and inner sides, said cords being located in a plurality of groups and said groups forming at least two spaces therebetween which are free of cords, a plurality of longitudinally spaced, laterally extending blocks positioned on said outer side, and fastener means connected between said blocks and said bed, said fastener means being located at said spaces.

3. A belt as in claim 2, and further comprising a plurality of teeth on said inner side of said bed, said teeth being located over and enclosing said fastener means.

4. A belt as in claim 3, wherein said teeth have rounded corners.

5. A belt as in claim 2, wherein each of said fastener means comprises an elongated washer which extends laterally across said inner side and substantially aligned with one of said blocks, and threaded means connecting said washer with said block.

6. A belt as in claim 1, wherein said cords are located in a plurality of groups forming at least two spaces therebetween which are free of said cords, and said bed has passages formed therethrough in said spaces.

7. A belt as in claim 6, wherein said bed has an inner side and an outer side, and a plurality of teeth formed on said inner side, said teeth being located between said passages.

8. A belt as in claim 1, wherein said cords are located in a group which is generally centrally located between the lateral sides of said bed, and said bed has a row of holes formed therethrough between said group and the adjacent lateral side of said bed.

9. A belt as in claim 8, wherein said bed has an inner side and an outer side, a plurality of longitudinally spaced teeth formed on said inner side adjacent said group, and a plurality of ribs formed on said outer side adjacent said group.

10. A process of making an endless belt, comprising the steps of providing a pair of spaced parallel rolls, winding a plurality of tension cords between and around said rolls, interconnecting the ends of each of said cords to form a junction, longitudinally shifting a plurality of said cords so that each of said junctions is longitudinally offset from the others, and covering both outer and inner sides of said cords with elastic material.

11. A process as in claim 10, and further comprising the step of arranging said cords in groups, said groups being laterally separated and having spaces therebetween, and forming openings through said belt in said spaces.

12. A process as in claim 11, and further comprising the step of positioning a plurality of longitudinally spaced blocks against one side of said belt, and fastening said blocks to said belt through said openings.

* * * * *